(12) United States Patent
Nakajima

(10) Patent No.: US 6,944,441 B1
(45) Date of Patent: Sep. 13, 2005

(54) OPERATION METHOD OF PORTABLE PHONE TO CHANGE MODE USING DIAL KEY AND APPARATUS FOR THE SAME

(75) Inventor: Toshikazu Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/504,875

(22) Filed: Feb. 16, 2000

(30) Foreign Application Priority Data

Feb. 16, 1999 (JP) .......................................... 11/037819

(51) Int. Cl.$^7$ .......................................... H04M 11/10
(52) U.S. Cl. ................................. 455/412.1; 455/550.1; 379/433.06
(58) Field of Search ................................ 455/412.1, 410, 455/414.4, 418, 426.1, 550.1, 575.1, 90.1, 565, 186.2, 426, 550, 575, 90, 412, 414; 379/364, 368, 433.06, 433

(56) References Cited

U.S. PATENT DOCUMENTS

| | | | | |
|---|---|---|---|---|
| 4,723,265 A | * | 2/1988 | Kamei et al. ................. | 455/584 |
| 5,280,516 A | * | 1/1994 | Jang ............................ | 340/7.1 |
| 5,305,372 A | * | 4/1994 | Tomiyori ..................... | 382/238 |
| 5,349,629 A | * | 9/1994 | Kumano ...................... | 455/564 |
| 5,491,745 A | * | 2/1996 | Roeder ..................... | 379/355.09 |
| 5,797,098 A | * | 8/1998 | Schroeder et al. ........... | 455/464 |
| 5,881,377 A | * | 3/1999 | Giel et al. ................. | 455/343.1 |
| 5,926,769 A | * | 7/1999 | Valimaa et al. .............. | 455/564 |
| 5,999,827 A | * | 12/1999 | Sudo et al. ................... | 455/564 |
| 6,072,868 A | * | 6/2000 | Irvin ....................... | 379/355.09 |
| 6,195,569 B1 | * | 2/2001 | Frederiksen ................. | 455/566 |
| 6,332,024 B1 | * | 12/2001 | Inoue et al. ............. | 379/433.06 |
| 6,381,468 B1 | * | 4/2002 | Larsen et al. ................ | 455/550 |

FOREIGN PATENT DOCUMENTS

| | | |
|---|---|---|
| GB | 2278756 A | 12/1994 |
| JP | 6292644 | 4/1987 |
| JP | 2-81546 | 3/1990 |
| JP | 3-21147 | 1/1991 |
| JP | 3-198455 | 8/1991 |
| JP | 8-83141 | 3/1996 |
| JP | 8-181760 | 7/1996 |
| JP | 9-186760 | 7/1997 |
| JP | 9-237145 | 9/1997 |
| JP | 9-261744 | 10/1997 |
| JP | 10-190812 | 7/1998 |
| JP | 10-190813 | 7/1998 |
| JP | 10-200620 | 7/1998 |
| JP | 10-257151 | 9/1998 |
| JP | 11-355414 | 12/1999 |

* cited by examiner

*Primary Examiner*—Marsha D Banks-Harold
*Assistant Examiner*—Nghi H. Ly
(74) *Attorney, Agent, or Firm*—Young & Thompson

(57) ABSTRACT

A portable phone includes dial keys (2) including at least one specific key and unspecific keys, and a processing unit (3). The processing unit determines whether one of the dial keys which is operated in a first mode is one of the unspecific dial keys, and changes an operation mode from the first mode to a second mode when the operated dial key is one of the unspecific dial keys. The portable phone further includes a display unit (5). In a telephone number searching operation mode as the second mode, the processing unit reads out a list of data associated with destination phone numbers from a storage unit (4) and controls the display unit to display as a non-dialing operation. Also, the processing unit controls the display unit to selectively scroll the list of data in one of upward and downward directions in response to an operation of one of the unspecific dial keys.

10 Claims, 5 Drawing Sheets

OPERATION METHOD OF PORTABLE PHONE TO CHANGE MODE USING DIAL KEY AND APPARATUS FOR THE SAME

BACKGROUND OF THE INVENTION

1. Field of the Invention

The present invention relates to an operation method and an operation apparatus of a portable phone, and more particularly to an operation method to change an operation mode by use of a dial key and an operation apparatus of a portable phone for the same.

2. Description of the Related Art

A small size portable phone has housing formed in a small size. In such a small size portable phone, a key is small and a pitch between the keys is narrow. Moreover, when multiple functions will be further achieved, it is more difficult to arrange a large number of keys which will increase in accordance to the number of functions.

As for the function with a high use frequency such as a telephone number searching operation, the operation needs to be simplified to make it easy for a user to use the function. However, the multiple functions require the user a complicated operation, even if the functions have high use frequencies. Therefore, another input unit such as a function key is often necessary in addition to dial keys.

When the user uses the telephone number searching function with the high use frequency, it is desired not to increase the number of keys. Also, it is desired that the key operation is simple.

In conjunction with the above description, a telephone is disclosed in Japanese Laid Open Patent Application (JP-A-Heisei 8-181760). In this reference, a received signal by an antenna is supplied to a modulating/demodulating section via a radio section and demodulated there. Then, a compressed speech data is separated from the demodulated signal by a TDMA processing section and decoded by a speech codec section so that a received speech signal is supplied to a speaker. A transmission speech signal is coded by the speech codec section and then subjected to a multiplexing process in the TDMA processing section. Further, after a modulating process by the modulating/demodulating section, the multiplexed signal is transmitted from the antenna via the radio section. A memory stores a telephone directory data. A telephone directory data searching key of a key input section such as an up key and a down key which are different from dialing numeral keys. At this time, an operation mode is changed from a wait mode to a telephone directory mode so that a first portion of the telephone directory data is displayed on a display section. Each time the searching key is operated, a next portion of the telephone directory data is displayed on the display section.

Also, a portable phone is disclosed in Japanese Laid Open Patent Application (JP-A-Heisei 9-261744). In this reference, a portable phone has a redialing function and a telephone directory function. A volume adjusting key is provided on a side surface of a main body. The key is used to adjust the volume when a currently received speech is outputted. The key is used as a replay volume in case of speech replay. The volume adjusting key functions as an adjusting key of a call arrival volume (call originating volume) within a predetermined time after a function key is operated. When the key is operated in the other states, an operation mode is changed to a search mode so that it is possible to search a redial data and a telephone directory data by use of the key.

Also, a portable phone is disclosed in Japanese Laid Open Patent Application (JP-A-Heisei 9-186760). In this reference, scroll keys are provided. When a telephone directory data is searched, one of katakana characters is specific and names are displayed from a specific name having the specific character as the head character. The specific character is changed by use of the scroll keys.

Also, a portable phone is disclosed in Japanese Laid Open Patent Application (JP-A-Heisei 10-190812). In this reference, a data containing a communication destination name and a telephone number is stored. All the stored data are classified into groups by dividing the stored data for every predetermined number in a storage order, or based on which line of hirakana sounds does the sound of the head character of the name belong to. An operation key is provided to be possible to operate to one of 8 directions of up and down directions, left and right directions and diagonal directions. The data in one group are searched in order through the operation of the key to the up or down direction and the group is changed through the operation of the key to the other direction.

SUMMARY OF THE INVENTION

Therefore, an object of the present invention is to provide an operation method and operation apparatus of a portable phone in which the number of keys is not increased for a function.

Another object of the present invention is to provide an operation method and operation apparatus of a portable phone in which the number of keys is not increased for a function and a key operation is simple.

In order to achieve an aspect of the present invention, an operation method of a portable phone includes: operating any one of dial keys in a call originating mode; determining whether the operated dial key is one of unspecific dial keys of the dial keys other than at least one specific dial key; and changing an operation mode from the call originating mode to one of non-dialing operation modes when the operated dial key is one of the unspecific dial keys.

Here, the non-dialing operation mode may be a telephone number searching operation mode.

Also, the operation method may further include: executing a non-dialing operation other than a dialing operation in the non-dialing operation mode when the operated dial key is one of the unspecific dial keys. In this case, the non-dialing operation may be a telephone number searching operation.

The specific dial key may be one selected from "0", "1" and "#", or only one which is predetermined. In this case, the non-dialing operation may be a telephone number search operation.

Also, the number of the unspecific dial keys may be at least two, and the executing a non-dialing operation includes: displaying a list of data associated with destination phone numbers. In this case, the operation method may further include: selectively scrolling the list of data in one of upward and downward directions in response to an operation of one of the unspecific dial keys.

In order to achieve another aspect of the present invention, a portable phone includes dial keys including at least one specific key and unspecific keys, and a processing unit. The processing unit determines whether one of the dial keys which is operated in a first mode is one of the unspecific dial keys, and changes an operation mode from the first mode to a second mode when the operated dial key is one of the unspecific dial keys.

Here, the first mode may be call originating mode and the second mode may be a telephone number searching operation mode.

Also, the processing unit may further execute a non-dialing operation other than a dialing operation when the operated dial key is one of the unspecific dial keys. In this case, the first mode may be call originating mode and the second mode may be a telephone number searching operation mode.

At least one specific dial key may be one selected from "0", "1" and "#", or may be only one which is predetermined. The non-dialing operation may be a telephone number search operation.

Also, the number of the unspecific dial keys may be at least two. When the portable phone further includes a display unit, the processing unit controls the display unit to display a list of data associated with destination phone numbers as a non-dialing operation, and controls the display unit to selectively scroll the list of data in one of upward and downward directions in response to an operation of one of the unspecific dial keys. In this case, a symbol indicating the scrolling direction is allocated to each of the unspecific dial keys.

Also, the number of the unspecific dial keys may be at least four. The processing unit changes the operation mode from the second mode to another mode in response to an operation of one of the unspecific dial keys. In this case, each of the unspecific dial keys has a shape indicating the scrolling direction.

DESCRIPTION OF THE PREFERRED EMBODIMENTS

Hereinafter, a portable phone of the present invention will be described below in detail with reference to the attached drawings.

Figure 1:
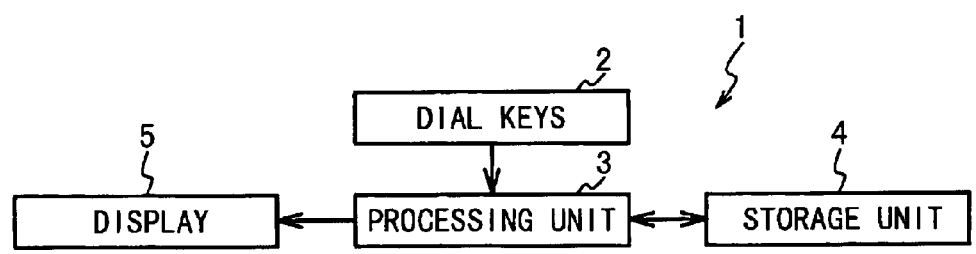
FIG. 1 is a circuit block diagram showing a portable phone according to a first embodiment of the present invention.

FIG. 1 shows a circuit block diagram showing a portable phone according to the first embodiment of the present invention. Referring to FIG. 1, the portable phone 1 in the first embodiment is composed of dial keys 2, a processing unit 3, a storage unit 4 and a display unit 5. The dial keys 2 are used to manually input digits and to change an operation mode. A signal corresponding to the dial key 2 is supplied to the processing unit 3. The processing unit 3 operates in accordance with a program which is stored in a memory (not shown), and is connected with the storage unit 4 and the display unit 5. A user stores sets of a destination name and a telephone number for the name in the storage unit 4. The processing unit 3 controls the display unit 5 to display a list of destination names in accordance with the input signal given from the dial key 2.

Figure 2:
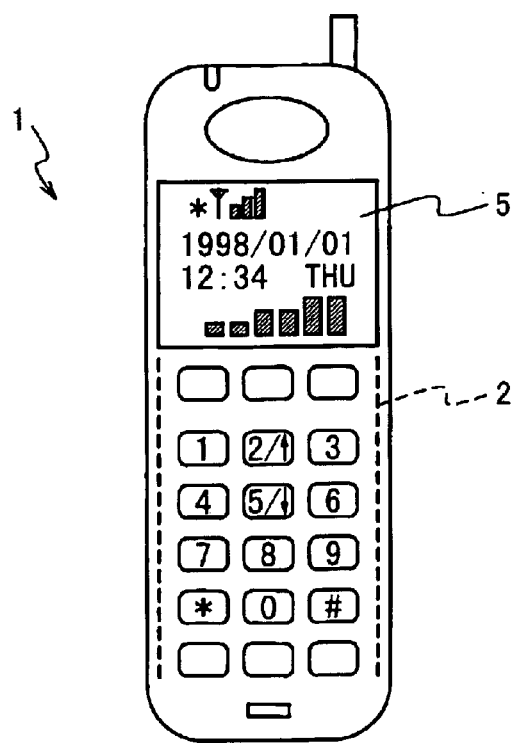
FIG. 2 is a plan view showing the portable phone according to the first embodiment of the present invention.

In the first embodiment, the dial key 2 of "2" and the dial key 2 of "5" are used for a telephone number searching operation. An upward arrow "↑" is attached to the dial key 2 of "2" and a downward arrow "↓" is attached to the dial key 2 of "5", as shown in FIG. 2. Thus, the user can easily recognize that the dial key 2 of "2" and the dial key 2 of "5" are used for the telephone number searching operation. It is desirable that the dial key 2 of "2" and the dial key 2 of "5" are formed in special shapes such as triangle, so that the dial key 2 of "2" and the dial key 2 of "5" can be visually and easily distinguished from the other dial keys 2 by the user.

Figure 3:
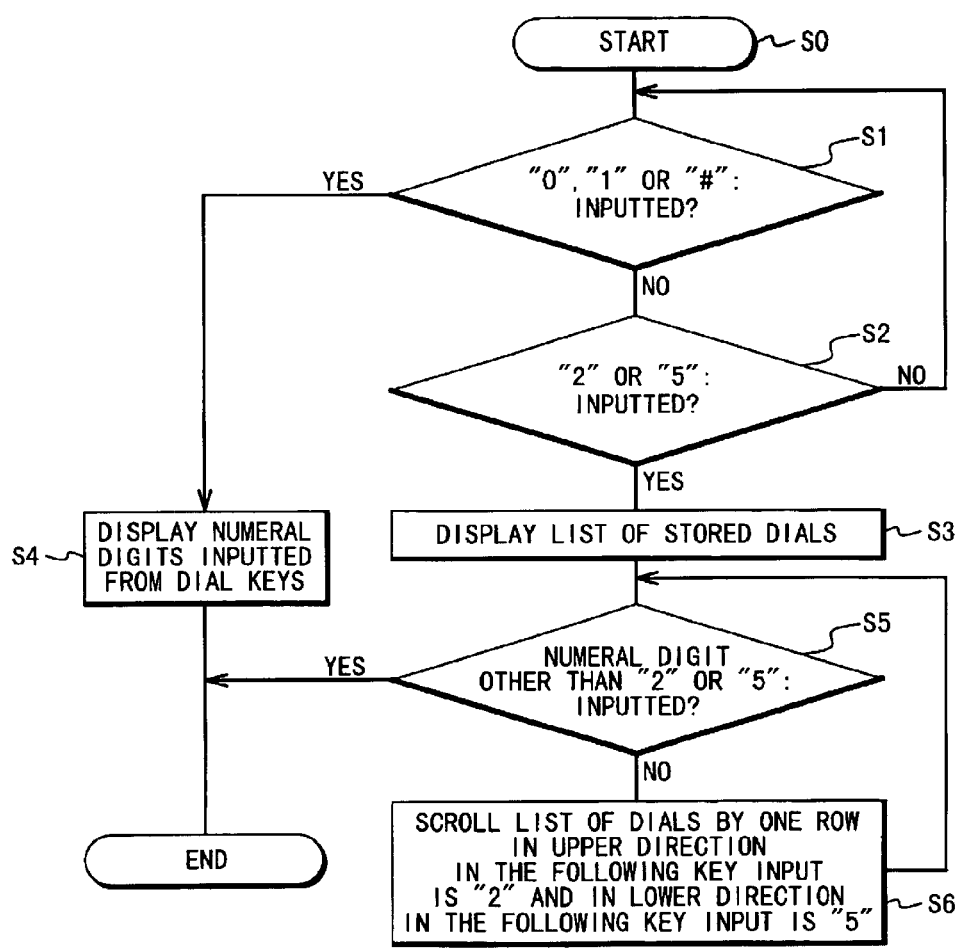
FIG. 3 is a flow chart showing the operation of the portable phone according to the first embodiment of the present invention.

Next, referring to FIG. 3, an operation method of the portable phone according to the first embodiment of the present invention will be described. Here, it is supposed that the portable phone is in a dialing operation mode.

Figure 4A:
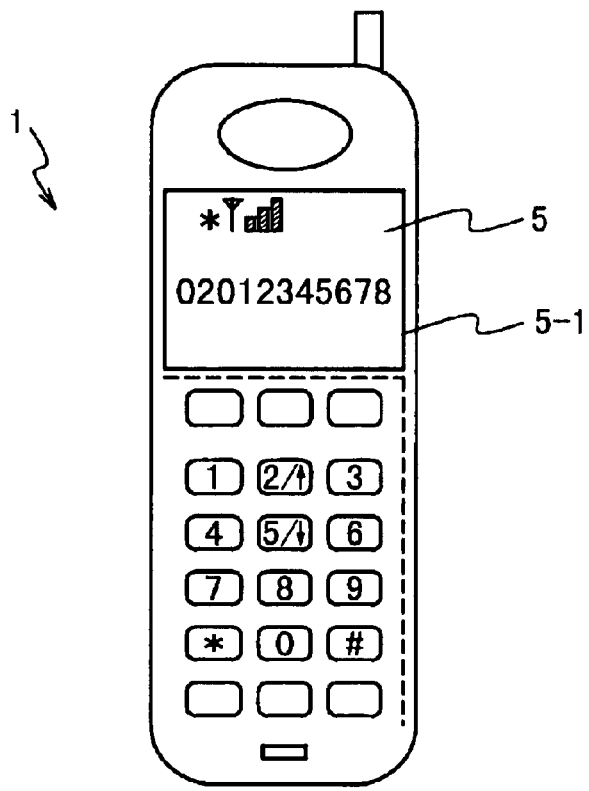
FIG. 4A is a plan view of an operating state of the portable phone according to the first embodiment of the present invention.
Figure 4B:
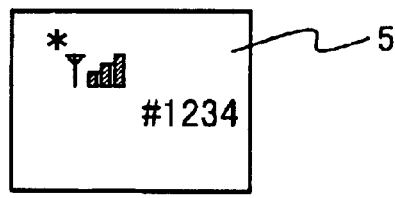
FIG. 4B is a plan view of a display screen showing another operating state the portable phone according to the first embodiment of the present invention.

First, it is determined whether the head of a character string or digit string 5-1 inputted through the key operation of the dial keys 2 is "0", "1" and "#" (step S1). In many portable phones, a special digit is first entered for a long-distance call. Generally, the special digit is "0", "1" or "#". If the head of the character string or digit string 5-1 inputted through the key operation is "0", "1" or "#" (Yes at the step S1), the character string or digit string 5-1 is fully displayed on the display unit 5 (Step S5). FIG. 4A shows "02012345678" as an example of such digit string 5-1. FIG. 4B shows "#1234" as another example.

When the head of the digit string 5-1 is not "0", "1" or "#" (No at the step S1), it is determined whether the head of the digit string 5-1 is "2" or "5" (Step S2). If the head of the digit string 5-1 is not "2" or "5", the control returns to the step S1.

Figure 5A:
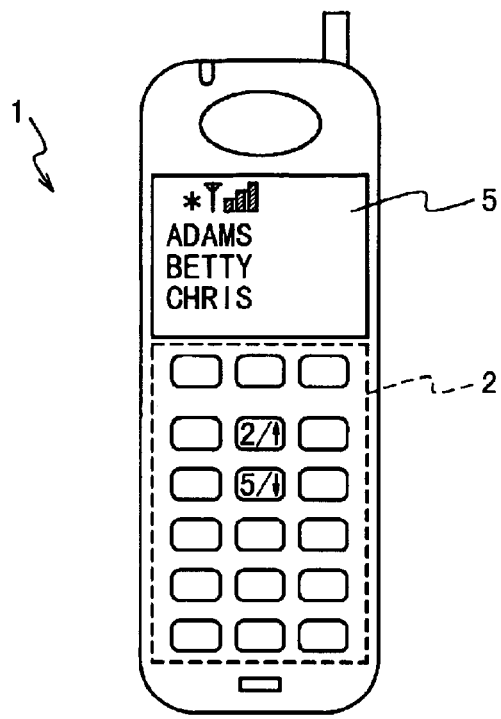
FIGS. 5A to 5C are plan views showing other operating states of the portable phone according to the first embodiment of the present invention.

When the head of the digit string 5-1 is "2" or "5" (Yes at the step S2), the processing unit 3 automatically changes the operation mode from the dialing operation mode to a telephone number searching operation mode. In this way, the processing unit 3 carries out a telephone number searching operation. That is, the processing unit 3 reads out the sets of a name and a telephone number from the storage unit 4. Then, the processing unit 3 controls the display unit 5 to display a list of sets of the name and the telephone number in the order of "a-i-u-e-o" or alphabet, as shown in FIG. 5A (Step S3). Here, it is supposed that the head and end of the list are linked.

Next, it is determined whether the following operated dial key 2 is the key "2↑" or key "5↓" (Step S5). When the key "2↑" or key "5↓" is not operated (Yes at the step S5), the control is ended.

Figure 5B:
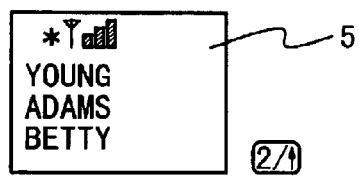
Figure 5C:
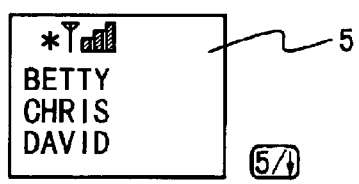

When the key "2↑" or key "5↓" is operated (No at the step S5), the control advances to a step S6. In this case, when the key "2↑" is operated, the processing unit 3 controls the display unit 5 to scroll the list by one line in the upward direction and to display the scrolled list, as shown in FIG. 5B. Also, when the key "5↓" is operated, the processing unit 3 controls the display unit 5 to scroll the list by one line in the downward direction and to display the scrolled list, as shown in FIG. 5C (Step S6). Thus, the list is scrolled to search a destination telephone number. Thereafter, the control returns to the step S5.

In the above mentioned illustration, the key of "2" and the key of "5" are selected as unspecific dial keys. Also, the keys of "0", "1" and "#" are selected as specific dial keys. However, if the key of "2" or the key of "5" is not first used to input the telephone number in the dialing operation, the operation mode is not changed and any function may be allocated.

Figure 6:
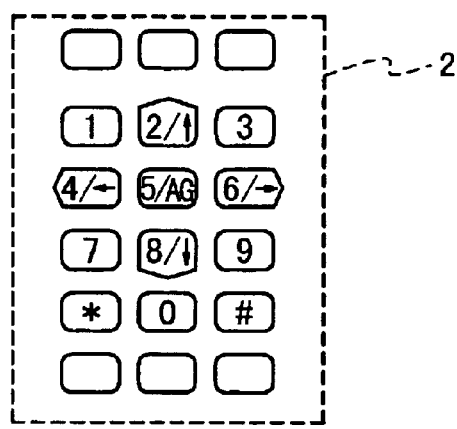
FIG. 6 is a plan view shows an operation unit of the portable phone according to a second embodiment of the present invention.

FIG. 6 shows the portable phone according to the second embodiment of the present invention. Referring to FIG. 6, the dial keys of "2", "4", "5", "6", and "8" are unspecific keys. When the dial key of "5/AG" is first operated as the head of the digit string, the operation mode may be changed from the dialing operation mode to the telephone number searching operation mode. When the dial keys of "2", "4", "6", or "8" is first operated, the operation mode may be changed to another operation mode.

In the telephone number searching operation mode, the telephone number records are displayed. When the dial key of "2↑", "4←", "6→", or "8↓" is operated, the searching operation of a target telephone number is carried out.

Figure 7:
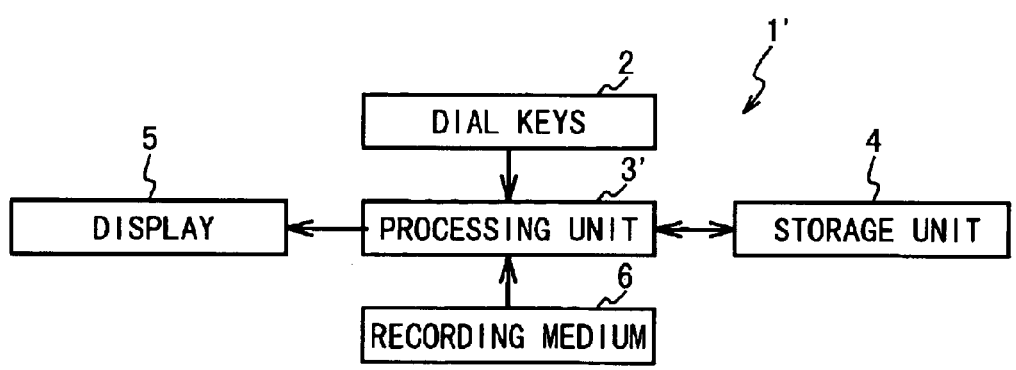
FIG. 7 is a circuit block diagram showing the portable phone according to a third embodiment of the present invention.

FIG. 7 shows the portable phone according to the third embodiment of the present invention. The portable phone 1' contains a recording medium 6 which stores a program for the telephone number searching operation. The semiconductor memory is an optimal for the portable phone as the recording medium 6. The processing unit 3' reads the program from the recording medium 6, and operates the program. The processing unit 3' executes the same processing as that of the processing unit 3 of FIG. 1.

According to the operation method and portable phone of the present invention, the retrieval of a telephone number is made quickly possible through only the operation of a dial key. Therefore, any key of exclusive use for the searching operation can be made unnecessary to be provided in addition to the dial keys and the number of parts can be reduced.

Also, according to the present invention, the operation mode can be changed using the dial key. Therefore, a function can be added without addition of a function key.

What is claimed is:

1. A method of operating a portable telephone having plural numbered dialing keys that each have a unique identity for dialing a telephone number, the method comprising the steps of:
   establishing the telephone in a call origination mode;
   operating one of the plural numbered dialing keys and determining the unique identity of the operated one of the plural numbered dialing keys; and
   as soon as the unique identity of the operated one of the plural keys is determined, changing from the call origination mode to an operating mode in which a call cannot be originated based on the determined unique identity of the operated one of the plural numbered dialing keys,
   wherein the step of changing from the call origination mode to an operating mode in which a call cannot be originated occurs when the determined identity of the operated one of the plural numbered dialing keys is one of a first set of the plural numbered dialing keys and wherein the step of changing from the call origination mode to an operating mode in which a call cannot be originated does not occur when the determined identity of the operated one of the plural numbered dialing keys is one of a second set of the plural numbered dialing keys that does not overlap the first set.

2. The method of claim 1, wherein the second set includes keys for "0" and "1" and the first set includes two of the plural numbered dialing keys that are next to each other.

3. A method of operating a portable telephone having plural numbered dialing keys for dialing a telephone number, the method comprising the steps of:
   establishing the telephone in a call origination mode;
   operating one of the plural numbered dialing keys and determining an identity of the operated one of the plural numbered dialing keys; and
   changing from the call origination mode to an operating mode in which a call cannot be originated based on the determined identity of the operated one of the plural numbered dialing keys,
   wherein the step of changing from the call origination mode to an operating mode in which a call cannot be originated occurs when the determined identity of the operated one of the plural numbered dialing keys is one of a first set of the plural numbered dialing keys and wherein the step of changing from the call origination mode to an operating mode in which a call cannot be originated does not occur when the determined identity of the operated one of the plural numbered dialing keys is one of a second set of the plural numbered dialing keys that does not overlap the first set.

4. The method of claim 3, further comprising the step of operating two keys in the first set to perform a search of stored telephone numbers.

5. The method of claim 3, wherein the second set includes keys for "0" and "1" and the first set includes two of the plural numbered dialing keys that are next to each other.

6. A portable telephone comprising:
   plural numbered dialing keys that each have a unique identity for dialing a telephone number; and
   a processor that establishes a call origination mode, determines the unique identity of an operated one of said plural numbered dialing keys, and as soon as the unique identity of the operated one of the plural keys is determined, changes the telephone from the call origination mode to an operating mode in which a call cannot be originated based on the determined unique identity of the operated one of the plural numbered dialing keys,
   wherein said plural numbered dialing keys include a first set of keys whose operation causes said processor to change from the call origination mode to the operating mode in which a call cannot be originated and a second set of keys whose operation causes said processor to stay in the call origination mode, said first set of keys not overlapping said second set of keys.

7. The portable telephone of claim 6, wherein the second set includes keys for "0" and "1" and the first set includes two of the plural numbered dialing keys that are next to each other.

8. A portable telephone comprising:
   plural numbered dialing keys for dialing a telephone number; and
   a processor that establishes a call origination mode, determines an identity of an operated one of said plural numbered dialing keys, and changes the telephone from the call origination mode to an operating mode in which a call cannot be originated based on the determined identity of the operated one of the plural numbered dialing keys,
   wherein said plural numbered dialing keys include a first set of keys whose operation causes said processor to change from the call origination mode to the operating mode in which a call cannot be originated and a second set of keys whose operation causes said processor to stay in the call origination mode, said first set of keys not overlapping said second set of keys.

9. The telephone of claim 8, wherein said processor performs a search of stored telephone numbers when a key in said first set of keys is operated.

10. The portable telephone of claim 8, wherein the second set includes keys for "0" and "1" and the first set includes two of the plural numbered dialing keys that are next to each other.

* * * * *